(12) United States Patent
Busch et al.

(10) Patent No.: US 8,893,431 B2
(45) Date of Patent: Nov. 25, 2014

(54) FARM IN A BOX

(75) Inventors: Douglas I. Busch, Malibu, CA (US); Adam Busch, Santa Monica, CA (US); Wayne Pendrey, Oak View, CA (US); Jeffrey Leland Walmsley, Carpenteria, CA (US)

(73) Assignee: Ecotech Farm In a Box, LLC, Malibu, CA (US)

( * ) Notice: Subject to any disclaimer, the term of this patent is extended or adjusted under 35 U.S.C. 154(b) by 694 days.

(21) Appl. No.: 13/114,627

(22) Filed: May 24, 2011

(65) Prior Publication Data

US 2012/0297679 A1    Nov. 29, 2012

(51) Int. Cl.
*A01G 9/02* (2006.01)
*A01G 31/02* (2006.01)

(52) U.S. Cl.
CPC ............... *A01G 9/022* (2013.01); *A01G 31/02* (2013.01)
USPC ............................................. 47/62 R; 47/79

(58) Field of Classification Search
CPC .......... A01G 9/02; A01G 9/022; A01G 31/02
USPC ................................ 47/62 R, 79, 82, 83, 65.9
See application file for complete search history.

(56) References Cited

U.S. PATENT DOCUMENTS

| | | | |
|---|---|---|---|
| 3,137,969 A | * | 6/1964 | Sokol .............................. 47/79 |
| 3,438,575 A | | 4/1969 | Rohling |
| 4,034,508 A | | 7/1977 | Dedolph |
| 4,218,847 A | | 8/1980 | Leroux |
| 4,268,994 A | | 5/1981 | Urai |
| 4,542,762 A | | 9/1985 | Littlehale |
| 5,265,376 A | | 11/1993 | Less |
| 5,279,071 A | | 1/1994 | McDougall |
| 5,425,198 A | | 6/1995 | Coy |
| 5,588,256 A | * | 12/1996 | Sherfield ....................... 47/62 R |
| 7,627,983 B1 | | 12/2009 | Deutsch-Aboulmahassine |
| 7,703,239 B2 | | 4/2010 | Steele |
| 2005/0252080 A1 | | 11/2005 | Wright |
| 2006/0156624 A1 | | 7/2006 | Roy et al. |
| 2008/0110086 A1 | | 5/2008 | Julia |
| 2010/0146855 A1 | | 6/2010 | Ma |

* cited by examiner

*Primary Examiner* — Monica Williams
(74) *Attorney, Agent, or Firm* — Millen, White, Zelano & Branigan, P.C.

(57) ABSTRACT

A vertical gardening apparatus with an outer shell enclosing an inner structure and liquid dispensing system that allows plants to grow on a vertical surface with minimum maintenance. Multiple vertical gardening apparatus may also be arranged together in aesthetically pleasing patterns on a wall.

19 Claims, 5 Drawing Sheets

FARM IN A BOX

FIELD OF THE INVENTION

The invention relates to gardening.

BACKGROUND OF THE INVENTION

A downside to gardening is that a garden typically takes up a lot of floor space. This is particularly undesirable in urban areas where square footage of floor space is limited. The invention allows individuals to grow their own plants in a limited amount of space and is aesthetically pleasing. The advantages of vertical gardening are known in the art and disclosed in U.S. Pat. No. 5,265,376 particularly columns 1 and 2 and more particularly, column 1 lines 49-59. The invention also has advantages over prior art systems such as US Patent Publication US 2006/0156624 in its simplicity, ease of use, and individuality of units. There is therefore a need for the invention described herein.

SUMMARY OF THE INVENTION

The present invention is a gardening apparatus for growing plants that is optionally hydroponic. Preferred plants are, for example, flowers, vegetables, succulents, herds, shrubs, bushes, small trees, and bonsai trees. The gardening apparatus comprises an outer shell which encapsulates its contents. The gardening apparatus also comprises an inner structure within the outer shell capable of supporting a plant or seeds in a growth medium and capable of retaining liquid. The gardening apparatus further comprises a liquid delivery system within the outer shell. In a preferred embodiment, the outer shell comprises two or more pieces that are connected via fasteners. The fasteners allow the outer shell to be easily removed from the gardening apparatus and re-attached without damaging the outer shell, the internal structure, or the liquid dispensing system.

In some embodiments, a gardening apparatus is made up of an outer shell adapted to be removable and re-attachable, an inner structure within the outer shell capable of supporting a plant or seeds in a growth medium when aligned vertically and capable retaining liquid, and a liquid delivery system. The outer shell can be disassembled, removed from the gardening apparatus, and re-attached to the gardening apparatus without damaging the outer shell or the functionality of the gardening apparatus as a whole.

For the purposes of this invention "growth medium" refers to any growing medium, for example, peat or peat like materials, wood residues, bagasse, rice hulls, perlite, vermiculite, clays, expanded polystyrene, urea formaldehydes, pellets, pods, pucks, and traditional dirt. In some embodiments, the growth medium will be compacted or held together with a mess or netting. In some embodiments, a soilless growth medium may be used. In some embodiments the soilless growth medium will comprise rigid and self supporting fiber web. We hereby incorporate by reference the teachings of U.S. Pat. No. 7,703,239 regarding the methods discussed for affixing plants in a growth medium in vertical systems.

The liquid in the liquid delivery system refers to any liquid capable of maintaining or supporting plant life. In some embodiments plain water is used. In other embodiments, nutrients, for example, nitrogen, potassium, and prosperous are mixed with water or some other inert liquid. The nutrients may also be provided separately from the liquid in the liquid delivery system and mixed to the desired concentrations in the first reservoir. These separated nutrients are preferably soluble in the liquid being used in the liquid delivery system and are optionally organic. Nutrients may also or alternatively be added to the growth medium.

In some embodiments, the liquid delivery system comprises a first refillable sealable reservoir positioned above the inner structure and capable of dispensing liquid into the inner structure though at least one opening in its bottom, for example a hole or holes. The liquid delivery system also comprises a second refillable reservoir positioned below the inner structure capable of receiving water from the inner structure. For example, the second reservoir can have an open top allowing the excess liquid from the inner structure to drip into the reservoir. There is also a tube connecting said first and second reservoirs. The tube enables a liquid dispensing negative feedback loop between the first and second reservoirs by creating a partial vacuum in the first reservoir when the water level in the second reservoir submerges the end of the tube in the second reservoir. A partial vacuum is formed in the first reservoir and the vacuum inhibits the dispensing of liquid by said first reservoir into the internal structure. When the water level of the second reservoir no longer covers the end of the tube, air flows through the tube into the first reservoir destroying the partial vacuum and allowing more liquid in the first reservoir to be dispensed into the inner structure. The partial vacuum formed in the first reservoir may optionally reduce the amount of liquid dispensed into the inner structure in a range of from 1% to 100%, for example, 5%, 10%, 25%, 35%, 55%, 75%, 90%, or 99% of the flow in the absence of a partial vacuum. The control of the flow rate can be manipulated by conventional means including the selection of the size, number, and position of the holes in the first reservoir. We hereby incorporate by reference the teachings of U.S. Pat. No. 5,425,198, as an example of an automatic watering device. See column 3 line 60 to column 5 line 6.

In some embodiments, the second refillable reservoir is positioned below the first reservoir for example directly below. In some embodiments the second refillable reservoir has an open or partially open top.

In some embodiments, the outer shell has at least one hole on one side, for example the front side, which exposes a portion of the inner structure to light and air.

In some embodiments, the inner structure is made up of at least one support structure to secure a plant or seeds in a growth medium and at least one liquid retaining structure. The support structure could be made from coco, woven natural fiber, synthetic fibers, or any inert material and the liquid retaining structure could be made from any material that retains and/or absorbs liquid. In some embodiments, the support structure also functions as the liquid retaining structure. In some embodiments, the roots of the plant grow into the support structure and/or the liquid retaining structure. The internal structure can vary widely in the number of layers and their composition. We hereby incorporate by reference the teachings of US Patent Publication 2008/0110086, particularly paragraphs [0033] through [0043], for the disclosure of suitable materials for use in the inner structure.

In some embodiments, the inner structure(s) have at least one hole capable of securing a plant in a growth medium therein for example 1, 2, 3, 4, 5, 6, 7, 8, 9, or 10 holes.

In some embodiments, the holes in the inner structure have a means for expanding, for example, slits cut into the internal structure allowing the perimeter of the holes to separate thereby making the holes larger in diameter. In some embodiments, the internal structures are capable of supporting a plant or seeds in a growth medium in any of its forms. In some embodiments, the internal structures are customized to support a particular form of a plant or seeds in a growth medium, for example, a peat puck or small plants in soil commonly obtained from a commercial garden center.

In some embodiments, the outer shell is made up of two pieces held together by fasteners. Fasteners can be, for example, screws, molded latches, clamps, clips, hook and loop, buttons, grooves, or snaps.

In some embodiments, the outer shell has hole(s) that conform in position and size to the hole(s) in the inner structure. In some embodiments, the hole(s) in the outer shell conform in position to the holes in the inner structure but is larger or smaller than the hole(s) in the inner structure.

In some embodiments, hole(s) in the bottom of the first refillable sealable reservoir selectively dispense the liquid.

The self contained gardening apparatus is made up of an outer shell adapted to be removable and re-attachable without damaging the structure surrounding an inner structure or structures within the outer shell capable of supporting a plant in a growth medium and capable of retaining liquid, and a liquid delivery system. The liquid delivery system is made up of a first refillable sealable reservoir capable of selectively dispensing liquid, positioned above a second refillable reservoir where holes on the bottom of the first reservoir release liquid into the inner structure, the inner structure drains any excess liquid into the second reservoir, and a tube connects said first and second reservoirs wherein said tube enables a liquid dispensing negative feedback loop between said first and second reservoirs by creating a vacuum in the first reservoir when the water level in the second reservoir submerges the end of the tube in the second reservoir and wherein said vacuum inhibits the dispensing of liquid by said first reservoir.

In some embodiments, the inner structures comprise at least one support structure and at least one liquid retaining layer.

In some embodiments, the inner structure has at least one hole capable of securing a plant in a growth medium.

In some embodiments, the holes can expand.

In some embodiments, the outer shell has a hole or holes that conform in size and position to holes in the inner structure.

In some embodiments, multiple gardening apparatus are arranged together in a pattern. The pattern can vary widely with the configuration of the outer shell. We hereby incorporate by reference the teachings of U.S. Pat. No. 7,627,983 regarding the arrangement of individual vertical units in a pattern.

In some embodiments, the structures are in the shape of a circle, square, rectangle, triangle, pentagon, hexagon, or octagon One method for growing plants which can be performed by an apparatus of this invention is to
  insert at least one plant in a growth media though the hole in the outer shell and into the hole in the inner structure,
  fill or partially filling the first reservoir with liquid, and
  seal the first reservoir.

Another method for growing plants which can be performed by an apparatus of this invention is by
  positioning a plurality of plants in a growing medium in a vertical array within a supporting medium between two water reservoirs, one positioned above the plants and another positioned below the plants,
  watering said plants through the supporting medium with liquid that is gravity fed from the reservoir positioned above the plants to the reservoir positioned below the plants,
  controlling the flow of liquid from the reservoir positioned above the plants by controlling the partial vacuum within the reservoir positioned above the plants, and
  controlling the vacuum with the reservoir positioned above the plants based on the liquid level in the reservoir positioned below the plants.

In some embodiments, an individual may operate the invention by opening the outer shell, removing at least one of the inner structures and any plant or growth medium or inert material, replacing the removed inner structure(s), placing a plant or seeds and growth medium into at least one of the holes in the structures, adding liquid to the first reservoir, and sealing the first reservoir with a cap. The first reservoir can also be resealed by other means, for example, snap top, fitted cap, lid, cork, a wrap, stopper, or plug.

In some embodiments, the liquid can be water or some nutrient enriched water.

In some embodiments, the gardening apparatus and system of this invention automatically regulate the flow of liquid maintaining the optimal level of moisture. In some embodiments liquid level indicator allows for easily visualization of the liquid level in at least one of the reservoirs. In some embodiments, the outer shell is sustainably made from a blend of bamboo fiber mixed with recycled plastic. In some embodiments, the material is a combination of recycled ABS or PVC plastic with a 30% blend of repurposed bamboo fiber mixed with sierra resin with the advantage of only taking five years to breakdown in a landfill.

In some embodiments, the outer shell, internal structure, and liquid dispensing system are free of toxins. In some embodiments, the inner structures are made of material that is 100% post consumer content and can be composted.

In some embodiments, the gardening apparatus is inexpensive and is disposable and/or the inner structures are inexpensive to replace and are disposable.

In some embodiments, the inner structure extends to the bottom of the second reservoir. This allows the inner structure to wick excess water in the bottom reservoir back into the inner structure. In some embodiments only a small section of the inner structure will extend into the second reservoir. In some embodiments, none of the sections of the inner structure will extend into the second reservoir.

The system is optionally completely passive in that once the first reservoir is filled with water it needs no external energy source to function. In some embodiments, the systems functions solely on force of gravity and the adhesion/cohesion properties of water. In some embodiments, there are no electronics in or on the apparatus. In some embodiments electronics are integrated into the apparatus, for example, a light is used to indicate the water level in the first reservoir is low. In other embodiments the apparatus has a window showing the water level in the first reservoir and/or the second reservoir.

In some embodiments, the openings in the first and/or second reservoir are covered by a porous barrier that allows liquid to pass through but blocks or partially bocks solids from passing through, for example, a net, mesh, or membrane. In some embodiments the second reservoir is filled or partially filled with rocks. The rocks are capable of separating liquid from solids that may fall into the second reservoir. Rocks may optionally be substituted by other similarly shaped objects, for example, marbles or pieces of glass.

In some embodiments the gardening apparatus has at least one reservoir with a window to indicate the internal liquid level. This also means that a window would be on the outer shell to so that the water level could be viewed when outer shell is attached to the gardening apparatus with the inner structure and liquid dispensing system enclosed.

In some embodiments the gardening apparatus has an outer shell comprising two pieces connected with fasteners adapted to be removable and re-attachable and has at least one hole capable of allowing a plant in growth media to pass through, an inner structure or structures within outer shell with at least one hole inline with the hole or holes in the outer shell and capable of receiving and supporting a plant in growth medium and capable of retaining liquid, and a liquid delivery system where a first refillable sealable reservoir capable of selectively dispensing liquid is positioned above the inner structure where holes on the bottom of the first reservoir release liquid into the inner structure, the inner structure drains any excess liquid into a second reservoir positioned below the inner structure, and a sealed tube connects said first and second reservoirs wherein said tube enables a liquid dispensing negative feedback loop between said first and second reservoirs by creating a vacuum in the first reservoir when the water level in the second reservoir submerges the end of the tube in the second reservoir and where said vacuum inhibits the dispensing of liquid by said first reservoir and where when the liquid level of the second reservoir recedes to a level where the tube is no longer covered the partial vacuum is destroyed and liquid from the first reservoir again begins to flow.

DETAILED DESCRIPTION OF THE DRAWINGS

100—A Gardening Apparatus

Figure 1:
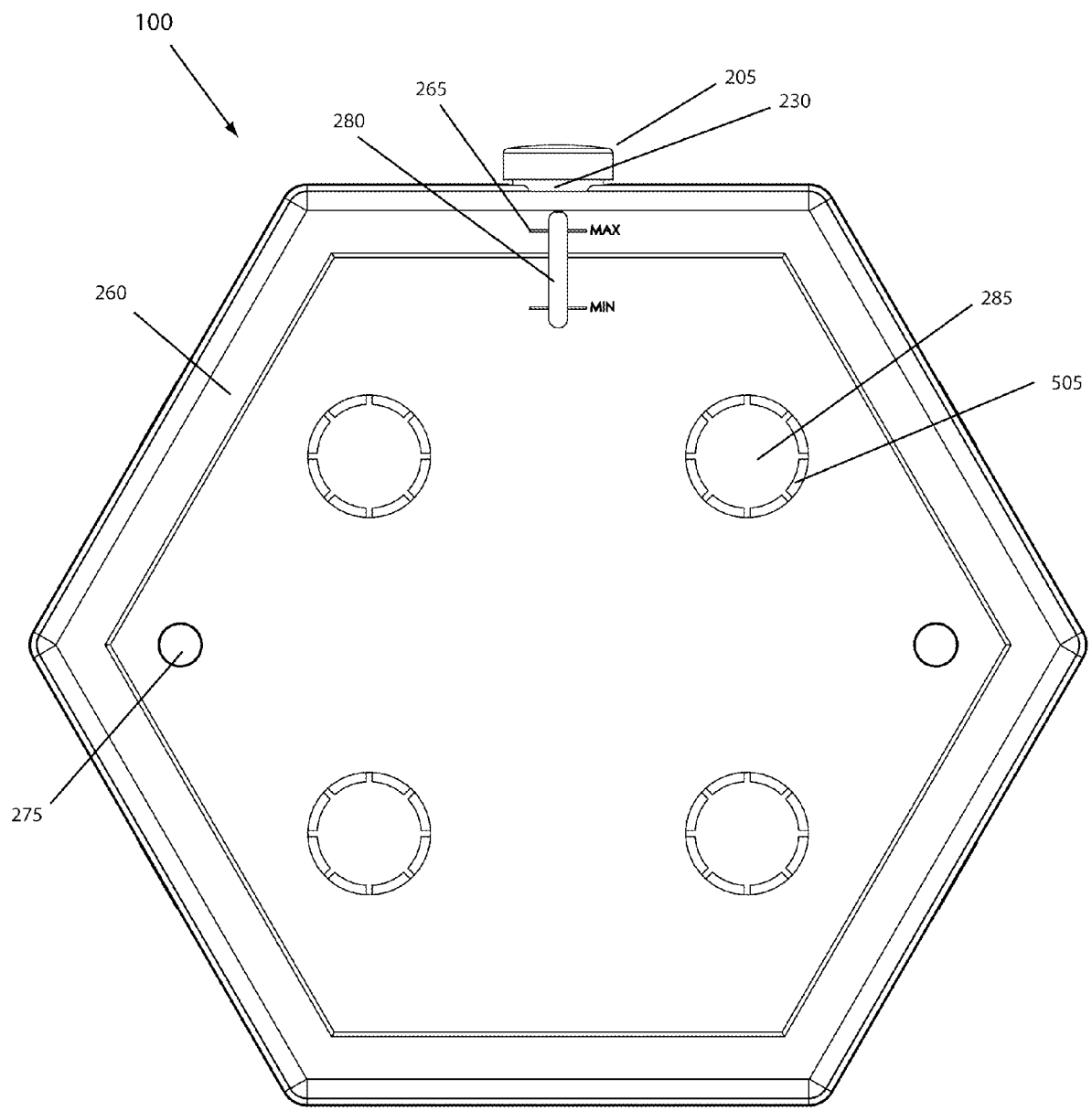
FIG. 1 is a front view of a hanging system and apparatus.
Figure 2:
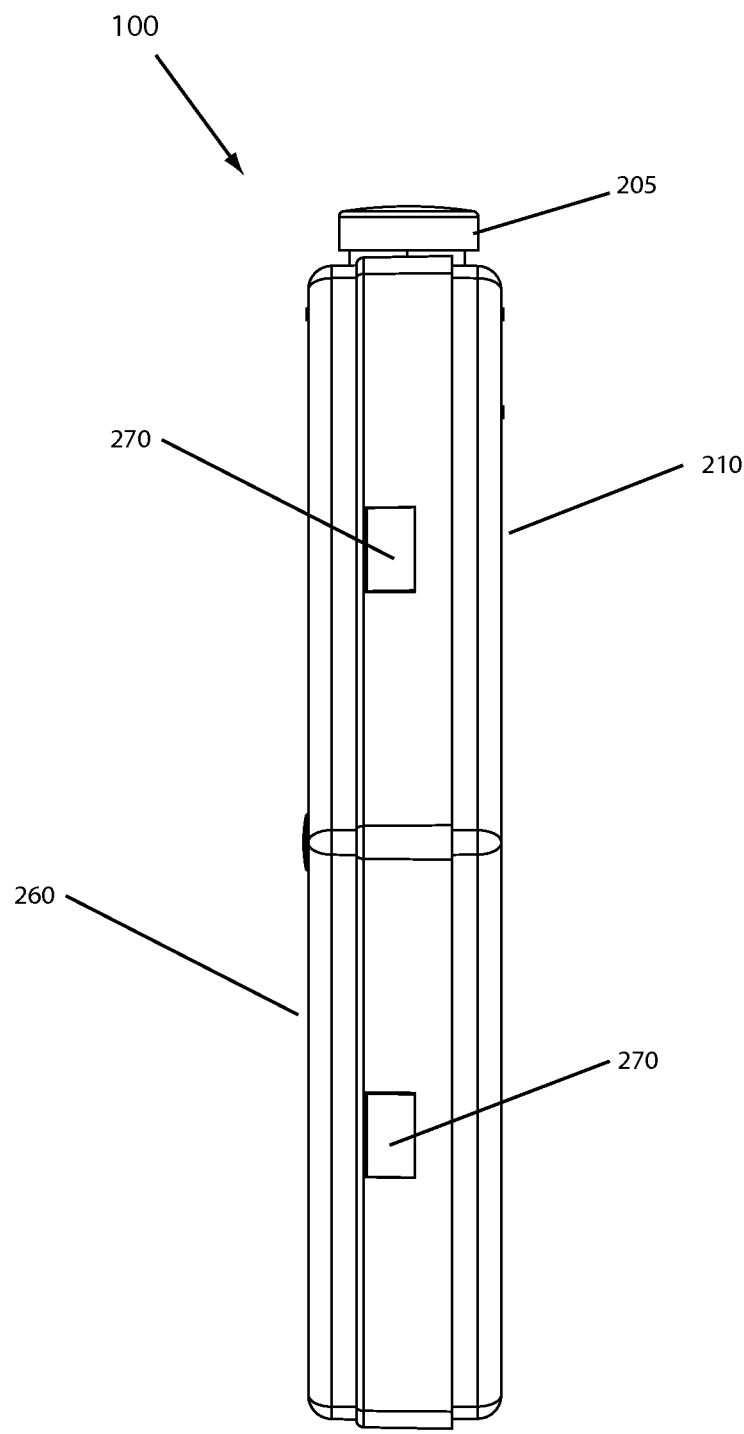
FIG. 2 is a side view of the hanging system and apparatus.
Figure 3:
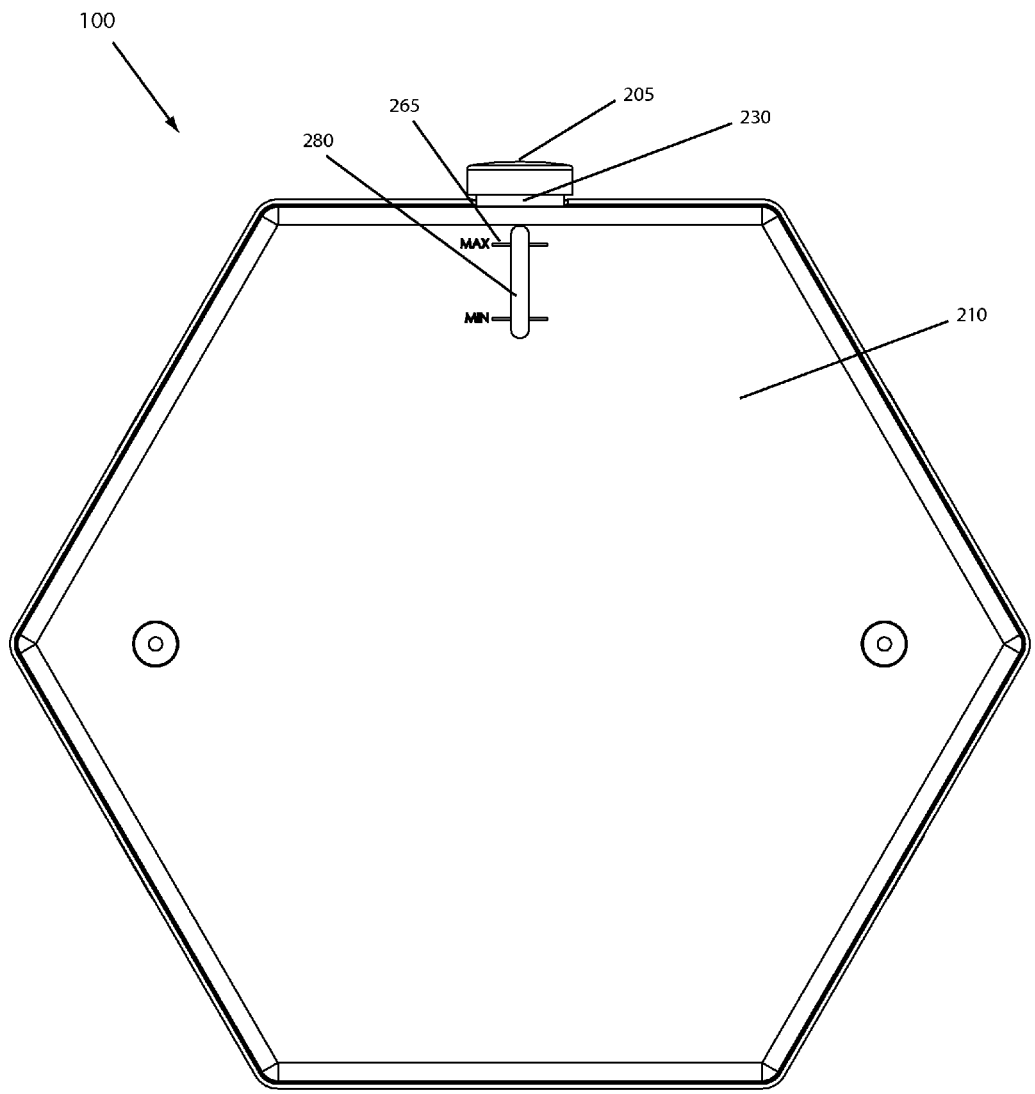
FIG. 3 is a back view of the hanging system and apparatus.
Figure 4:
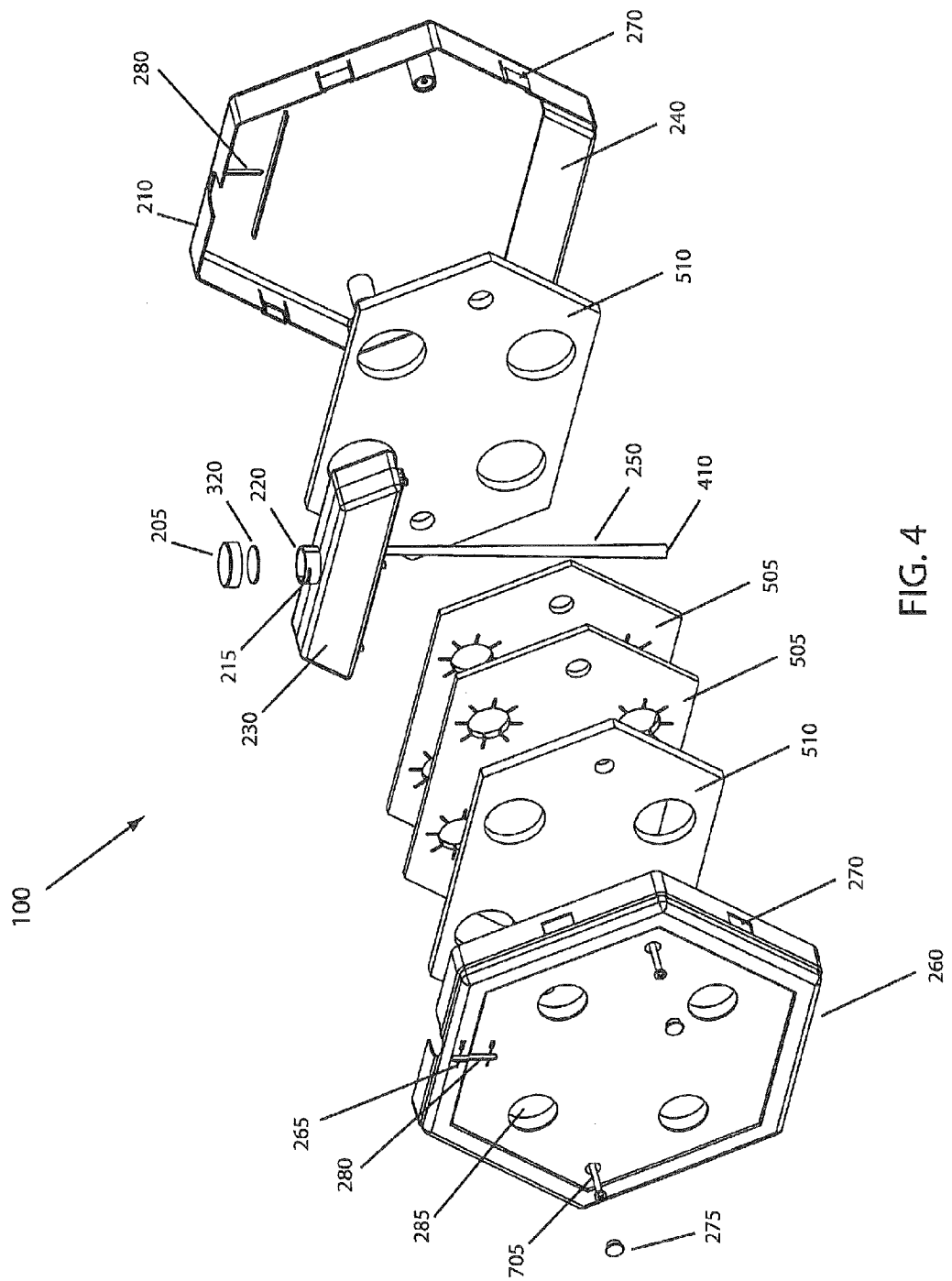
FIG. 4 is an exploded view of the hanging system and apparatus.
Figure 5:
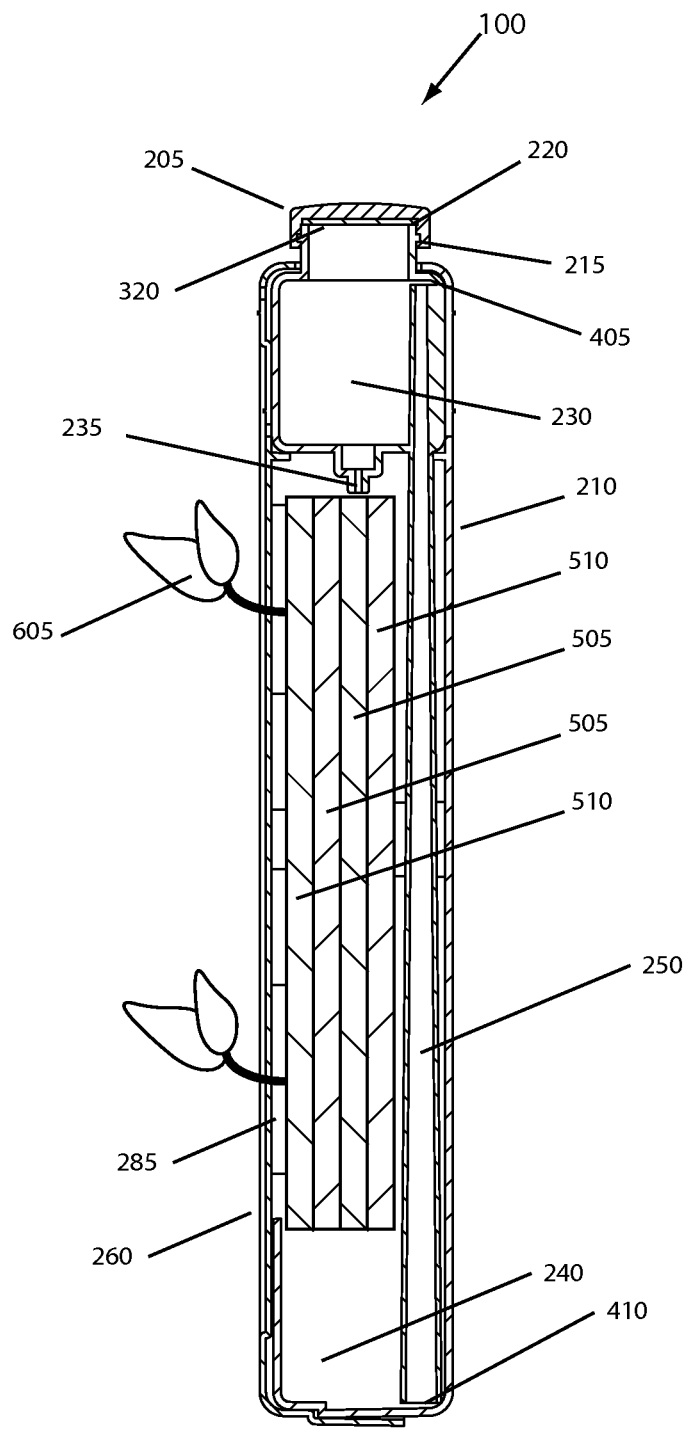
FIG. 5 is a cross sectional view of the hanging system and apparatus.

The reservoir cap (205) attaches to the back section (210) using a fastening means (215) for example mating molded threads optionally found in each part. The cap (205) forms an air-tight seal against the top face (220) of the first reservoir (230) using a rubber gasket (320)

The first reservoir (230) is filled with liquid, optionally water and/or fertilizer, to the fill line (265). Above the fill line (265) is the upper portion (405) of the first reservoir (230). The liquid is able to drip or flow freely through the hole(s) (235) in the first reservoir (230) and onto the internal structures, the liquid absorbing material, for example, a sponge (505) and support structure, for example, coco material (510). The excess liquid is collected in the second reservoir (240) which is attached to the back section (210). When the liquid in the second reservoir (240) has risen above the end (410) of the tube (250), the free flow of air through the air tube (250) connecting the second reservoir (240) with the first reservoir (230). This creates a vacuum in the first reservoir (240) which inhibits or stops liquid from dripping or flowing through the holes (235) until the liquid is absorbed or otherwise dries out of the second reservoir and exposes the end (410) of the air tube (250) allowing air to flow again and destroying the vacuum.

Plants (605) grow through openings (285) in the front section (260) with their roots attached to the inner structures (510) and (505). They are able to grow continuously in a perfectly controlled environment because the self-regulating watering system is never to dry or to wet.

The front section (260) and back section (210) attaches to each other by fastening means (270). The two halves thereby house and locate all of the other components inside and form the complete assembly (100). The complete assembly (100) can then be mounted to the wall with a fastening means, for example, screws (705) which are then covered by decorative hole covers (275) (brackets, mounts, stands, frame, etc.)

The user is then able to observe the liquid level in the reservoir by looking through openings (280) in the front section (260) and FIB back section (210) and refill as needed.

The invention claimed is:
1. A gardening apparatus comprising:
   A) an outer shell encapsulating an inner structure and liquid delivery system,
   B) at least one inner structure within the outer shell with at least one generally planar medium capable of supporting a plant or seeds in growth medium when aligned vertically and capable of retaining liquid, and
   C) a liquid delivery system within the outer shell wherein the liquid delivery system comprises:
      i) a first refillable and sealable reservoir positioned above the inner structure and capable of dispensing liquid into the inner structure though at least one opening,
      ii) a second refillable reservoir positioned below the inner structure capable of receiving water from the inner structure, and
      iii) a tube connecting said first and second reservoirs wherein said tube is open on each end and wherein the open end of the tube in the second reservoir is positioned in a bottom portion of the second reservoir, wherein said tube enables a liquid dispensing negative feedback loop between said first and second reservoirs by creating a partial vacuum in the first reservoir when the water level in the second reservoir submerges the end of the tube in the second reservoir and wherein said vacuum inhibits the dispensing of liquid by said first reservoir and wherein when the liquid level of the second reservoir recedes to a level where the tube is no longer covered by liquid the partial vacuum is destroyed and liquid from the first reservoir again begins to flow through the at least one opening.
2. A gardening apparatus of claim 1 wherein the at least one inner structure comprises multiple layers that are generally the same size and shape and are aligned one after another.
3. A gardening apparatus of claim 1 wherein the at east one inner structure at least partially extends into the second reservoir.
4. A gardening apparatus of claim 1 wherein said outer shell has a front and a back side and wherein the outer shell has at least one hole on one side.
5. A gardening apparatus of claim 4 wherein the at least one inner structure has at least one hole capable of securing a plant in growth medium therein, wherein each of said holes is positioned inline with the holes in the outer shell.
6. A gardening apparatus of claim 5 wherein the holes are capable of increasing their diameter between 1 to 5 inches.
7. A gardening apparatus of claim 1 wherein said at least one inner structure comprise:
   at least one support layer and at least one liquid retaining layer.
8. A gardening apparatus of claim 7 wherein the at least one inner structures have at least one hole capable of securing a plant in growth medium therein, wherein each of said holes is positioned inline with holes in the outer shell.
9. A gardening apparatus of claim 1 wherein the outer shell comprises 2 pieces held together by fasteners wherein the outer shell can be taken apart and put back together without damaging the outer shell.

10. A gardening apparatus of claim 1 wherein the first refillable sealable reservoir has at least one hole in its bottom capable of selectively dispensing liquid.

11. A method for growing plants which can be performed by the gardening apparatus of claim 1, said method comprising:
    inserting at least one plant in a growth media though a hole in the outer shell and into a hole in the at least one inner structure,
    filling or partially filling the first reservoir with liquid, and
    sealing the first reservoir.

12. A method for growing plants which can be performed by the gardening apparatus of claim 1, said method comprising:
    positioning a plurality of plants in a growing medium in a vertical array within a supporting medium between two water reservoirs, one positioned above the plants and another positioned below the plants,
    watering said plants through the supporting medium with liquid that is gravity fed from the reservoir positioned above the plants to the reservoir positioned below the plants,
    controlling the flow of liquid from the reservoir positioned above the plants by controlling a partial vacuum within the reservoir positioned above the plants, and
    controlling the partial vacuum with the reservoir positioned above the plants based on the liquid level in the reservoir positioned below the plants.

13. A system comprising:
    more than one gardening apparatus of claim 1 arranged in a pattern on a wall.

14. A gardening apparatus of claim 1 wherein the outer shell is in the shape of a circle, square, rectangle, triangle, pentagon, hexagon, or octagon.

15. A method for using the gardening apparatus of claim 1 comprising:
    attaching one or several gardening apparatuses to a wall or fence or mount or frame,
    placing a plant or seeds and growth medium into at least one hole in the outer shell and at least one inner structure,
    adding liquid to the first reservoir, and
    sealing the first reservoir.

16. A method for reusing the gardening apparatus of claim 1 comprising:
    opening the outer shell,
    removing the at least one inner structure and any plant or growth medium material,
    replacing the removed at least one inner structure,
    placing a plant or seeds and growth medium into at least one hole in the outer shell and at least one inner structure,
    adding liquid to the first reservoir, and
    sealing the first reservoir.

17. A gardening apparatus of claim 1 wherein at least one reservoir has a window to indicate the internal liquid level.

18. A gardening apparatus of claim 1 wherein said one end of the tube is positioned in an upper portion of the first reservoir and one end of the tube is positioned in the bottom portion second reservoir.

19. A gardening apparatus comprising:
    an outer shell comprising two pieces connected with fasteners adapted to be removable and re-attachable to said gardening apparatus with at least one hole capable of allowing a plant in growth media from said gardening apparatus,
    at least one inner structure within said outer shell with at least one hole inline with the hole or holes in the outer shell and capable of receiving and supporting a plant in growth medium when aligned vertically and capable of retaining liquid, and
    a liquid delivery system wherein a first refillable sealable reservoir capable of selectively dispensing liquid is positioned above the inner structure wherein holes on the bottom of the first reservoir release liquid into the inner structure, the inner structure drains any excess liquid into a second reservoir positioned below the inner structure, and a tube connects said first and second reservoirs wherein said tube is open on each end and wherein the open end of the tube in the second reservoir is positioned in a bottom portion of the second reservoir, wherein said tube enables a liquid dispensing negative feedback loop between said first and second reservoirs by creating a vacuum in the first reservoir when the water level in the second reservoir submerges the end of the tube in the second reservoir and wherein said vacuum inhibits the dispensing of liquid by said first reservoir and wherein when the liquid level of the second reservoir recedes to a level where the tube is no longer covered the vacuum is destroyed and liquid from the first reservoir again begins to flow.

\* \* \* \* \*